United States Patent
Shiba

(10) Patent No.: US 8,831,018 B2
(45) Date of Patent: *Sep. 9, 2014

(54) MEDIA CONVERSION DEVICE FOR INTERCONNECTING COMMUNICATION TERMINAL DEVICES WITH MEDIA CONVERTED AND A METHOD THEREFOR

(75) Inventor: Shugo Shiba, Chiba (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 56 days.

This patent is subject to a terminal disclaimer.

(21) Appl. No.: 13/570,290

(22) Filed: Aug. 9, 2012

(65) Prior Publication Data

US 2012/0300786 A1  Nov. 29, 2012

Related U.S. Application Data

(63) Continuation of application No. 12/153,868, filed on May 27, 2008, now Pat. No. 8,331,382.

(30) Foreign Application Priority Data

May 28, 2007 (JP) ................................. 2007-140764

(51) Int. Cl.
   H04L 12/28 (2006.01)
   H04L 12/413 (2006.01)
   H04L 12/66 (2006.01)

(52) U.S. Cl.
   CPC .................................... *H04L 12/66* (2013.01)
   USPC .......................................... 370/401; 370/466

(58) Field of Classification Search
   None
   See application file for complete search history.

(56) References Cited

U.S. PATENT DOCUMENTS

| 7,251,241 | B1 * | 7/2007 | Jagadeesan et al. | 370/389 |
|---|---|---|---|---|
| 7,383,347 | B2 | 6/2008 | Ebling et al. | |
| 7,489,698 | B2 | 2/2009 | Blossom et al. | |
| 2002/0085534 | A1 | 7/2002 | Williams et al. | |
| 2003/0128696 | A1 * | 7/2003 | Wengrovitz et al. | 370/401 |
| 2003/0185232 | A1 | 10/2003 | Moore et al. | |
| 2004/0109459 | A1 * | 6/2004 | Madour et al. | 370/401 |
| 2006/0007954 | A1 | 1/2006 | Agrawal et al. | |
| 2006/0026294 | A1 | 2/2006 | Virdi et al. | |
| 2006/0268937 | A1 * | 11/2006 | Choi | 370/477 |
| 2007/0268896 | A1 * | 11/2007 | Oyama et al. | 370/389 |
| 2008/0013534 | A1 * | 1/2008 | Tsuzuki et al. | 370/389 |
| 2008/0080519 | A1 | 4/2008 | Park et al. | |

FOREIGN PATENT DOCUMENTS

JP   2006-210973   8/2006

* cited by examiner

*Primary Examiner* — Gregory Sefcheck
*Assistant Examiner* — Joshua Smith
(74) *Attorney, Agent, or Firm* — Rabin & Berdon, P.C.

(57) ABSTRACT

A gateway device includes a SIP server and a media converter. The SIP server uses media communication control data output from communication terminal devices (CTDs) to discriminate the communication media standards adopted by the CTDs, based on a call control, to call-control the CTDs. The media converter uses the communication media standards discriminated and acquired to convert media data, delivered from the CTDs, involved in communication, to a signal of a relevant communication media standard. The SIP server causes the communication media standard and information used for communication to be stored in an information memory. The media converter includes input/output interfaces, a controller, a media converter circuit and a data switcher. The interfaces verify whether or not the received data is media data, the media converter circuit converts the communication media standard of received media data received from the source CTD to a communication media standard of the destination CTD.

7 Claims, 8 Drawing Sheets

| SESSION IDENTIFIER | SESSION IDENTIFICATION INFORMATION | | DESTINATION ENCODING RULE | TRANSMISSION SOURCE ENCODING RULE |
|---|---|---|---|---|
| | DESTINATION IP ADDRESS | DESTINATION PORT NO. | | |
| 1 | 10.0.0.1 | 10001 | G.711μ-law | G.722.1 |
| 1 | 20.0.0.1 | 20001 | G.722.1 | G.711μ-law |
| ... | | | | |

FIG. 3

| SESSION IDENTIFIER | SESSION IDENTIFICATION INFORMATION ||  DESTINATION ENCODING RULE | TRANSMISSION SOURCE ENCODING RULE |
|---|---|---|---|---|
| 38 | 46 DESTINATION IP ADDRESS | 48 DESTINATION PORT NO. | 42 | 44 |
| 1 | 10.0.0.1 | 10001 | G.711μ-law | G.722.1 |
| 1 | 20.0.0.1 | 20001 | G.722.1 | G.711μ-law |
| ... | | | | |

FIG. 7

| IDENTIFIER | IP NETWORK ADDRESS | ENCODING RULE |
|---|---|---|
| 1 | 10.0.0.0/24 | G.711$\mu$-law |
| 2 | 20.0.0.0/24 | G.722.1 |
| ⋮ | ⋮ | ⋮ |

MEDIA CONVERSION DEVICE FOR INTERCONNECTING COMMUNICATION TERMINAL DEVICES WITH MEDIA CONVERTED AND A METHOD THEREFOR

CROSS-REFERENCE TO RELATED APPLICATION

This application is a continuation of application Ser. No. 12/153,868, filed on May 27, 2008. Furthermore, this application claims the benefit of priority of Japanese application 2007-140764 filed on May 28, 2007. The disclosures of these prior U.S. and Japanese applications are incorporated herein by reference.

BACKGROUND OF THE INVENTION

1. Field of the Invention

The present invention relates to a media conversion device for interconnecting communication terminal devices with media converted, and more particularly to a gateway device for interconnecting a plurality of communication terminal devices over a plurality of communications networks with media data handled by one of the communication terminal devices converted to media data that can be handled by another communication terminal device to thereby establish the communication between the communication terminal devices. The present invention also relates such a method therefor.

2. Description of the Background Art

Nowadays, telecommunications networks can handle a large variety of sorts of data by transmitting, for example, image data as on IP (Internet Protocol) or television telephony, or as in an instant message system that transmits text data on an end-to-end basis. For communication terminal devices connected to a telecommunications network, media conversion or, more precisely, multi-media format conversion, in conformity with a communication peer has been proposed for transmitting or receiving such media data.

In a communication terminal device, disclosed in Japanese patent laid-open publication No. 2006-210973, speech signals from a party on communication are converted into text displayed for viewing by a user of the communication terminal device, and the user enters a return message in the form of text on a keyboard, for instance, to be synthesized therefrom into a speech signal, which is in turn transmitted to a communication peer, to thereby enable talk with the communication peer on speech or television telephony, while the communication peer is talking with a further communication peer.

A media conversion device, disclosed in U.S. patent application publication No. US 2006/0026294 A1 to Virdi et al is provided in a server adapted to deliver contents, such as videos, by streaming over a telecommunications network, and determines communication media of a proper bit rate in dependence upon the bandwidth of the network over which client terminal devices are connected to a server to deliver contents with bit rates and communication media converted.

Between IP telephony or Internet connection business organizations, interconnections may sometimes be established. As is the case with communication media handled being of IP telephony involving multiple, different speech encoding or compression systems, there are cases in which, when interconnecting different networks, media converting gateway devices are placed on the boundaries between the networks to interconnect the terminal devices over the plural networks.

The communication terminal device taught by Japanese '973 publication and the media conversion device taught by Virdi et al are adapted to discriminate, when transmitting or receiving media data, the communication media between a conversion source and a conversion destination to perform the media conversion accordingly.

It was difficult for an intermediate device, such as a gateway device, arranged between terminal devices, to be unable to discriminate the communication media between the terminal devices of the source of transmission and the destination of transmission to perform the media conversion thereon.

SUMMARY OF THE INVENTION

It is an object of the present invention to provide a media conversion device which is arranged between a plurality of telecommunications networks over which a plurality of communication terminal devices engage multi-media communications and discriminates communication media between the terminal devices of the communication source and the communication destination from each other to interconnect the communication terminal devices in accordance with the discrimination, and also to provide a corresponding media conversion method.

In accordance with the present invention, there is provided a media conversion device for relaying media communication between a plurality of communication terminal devices, connected to a plurality of different networks, in which the media conversion device comprises a server and a media converter. The server discriminates communication media standards, adopted by the communication terminal devices, from control data for controlling media communication, supplied from the communication terminal devices, based on a call control protocol, to exercise call control for the communication terminal devices. The media converter uses the communication media standards discriminated and acquired to convert media data supplied from the communication terminal devices, involved in communication, to a signal of the relevant communication media standard. The server includes a first memory for storing the communication media standards and information used for communication. The media converter includes a plurality of interfaces for receiving or outputting the control data, the media data and non-media data supplied from the communication terminal devices, and for verifying whether or not received data is the media data. The media converter also includes a converter circuit for converting the communication media standard of the received media data included in the data received from the communication terminal devices to media data of the communication media standard of the communication terminal device of an output destination. The media converter also includes a controller for reading out the information stored in the first memory, for controlling the delivery of the read-out information to the interfaces and the converter circuit to control the interfaces, the converter circuit and a data switcher. The data switcher operates for switching data transfer to the interfaces, the converter circuit and the controller.

In accordance with the present invention, there is also provided a media conversion method for relaying media communication between communication terminal devices connected to a plurality of different networks. The media conversion method comprises a first step of using control data for controlling media communication output from one to another of the communication terminal devices to discriminate communication media standards adopted by the communication terminal devices, based on a call control protocol, to perform call control of the communication terminal devices. The media conversion method comprises a second step of using the communication media standards, discriminated and acquired to convert media data, delivered from the communication terminal devices, involved in communication, to a signal of the relevant communication media standard. The first step includes a first substep of storing the communication media standards and information used for communication. The second step includes a second substep of reading out the stored information and controlling the delivery of the read-out information, and a third substep of receiving the control data, the media data and non-media data, delivered from one of the communication terminal devices, and verifying whether or not the received data is the media data. The second step also includes a fourth substep of converting the communication media standard of received media data included in the data received from the one communication terminal device to media data of the communication standard used by the other communication terminal device, and a fifth substep of outputting the media-converted media data to the other communication terminal device.

In accordance with the present invention, there is also provided a media conversion program for having a computer operate as a media converter including a first functional block for discriminating communication media standards adopted by the communication terminal devices, from control data for controlling media communication output from one to another of a plurality of communication terminal devices, based on a call control protocol, to perform call control on the communication terminal devices, and as a second functional block for using the communication media standards discriminated and acquired to convert media data, delivered from the communication terminal devices, involved in communication, to a signal of a relevant communication media standard. The first functional block includes a first functional subblock for storing the communication media standards and information used for communication. The second functional block includes a plurality of interface functional subblocks for receiving or outputting the control data, the media data and non-media data supplied from the communication terminal devices, and for verifying whether or not the received data is the media data. The second functional block also includes a conversion functional subblock for converting the communication media standard of the received media data included in the data received from the communication terminal device to media data of the communication standard used by the communication terminal device as a destination device. The second functional block also includes a control functional subblock for reading out information stored in the first functional subblock, controlling the delivery of the read-out information to the interface functional subblocks and the conversion functional subblock, and for controlling the interface functional subblocks, the conversion functional subblock and the control functional subblock. The second functional block further includes a data switching functional subblock for switching data delivery to the interface functional subblocks, the conversion functional subblock and the control functional subblock.

In accordance with the present invention, there is also provided a control device including a server for discriminating a communication media standard adopted by a plurality of communication terminal devices from control data for controlling media communication supplied from one of the communication terminal devices, based on a call control protocol, and for call controlling the communication terminal devices. The server outputs the communication media standard discriminated to another of the communication terminal devices.

In accordance with the present invention, there is further provided a media converter for converting media data delivered from a plurality of communication terminal devices, involved in communication, to a signal conforming to a relevant communication media standard, using communication media standards discriminated and acquired. The media converter comprises a plurality of interfaces for receiving or outputting the control data, the media data and non-media data, delivered from the communication terminal devices, and for verifying whether or not received data is the media data. The media converter also comprises a converter circuit for converting the communication media standard of received media data included in the received data from the communication terminal devices to media data of the communication media standard of the communication terminal device of an output destination. The media converter further comprises a controller for reading out the information stored in a first memory, configured to store the communication media standards and information used for communication, for controlling the delivery of the read-out information to the interfaces and the converter circuit, and for controlling the interfaces, the converter circuit and a data switcher. The data switcher switches data delivery to the interfaces, the converter circuit and the controller.

Advantageously, a gateway device according to the present invention may include a SIP (Session Initiation Protocol) server and a media converter. The SIP server discriminates, from control data for controlling media communication output from each of a plurality of communication terminal devices, the communication media standards adopted by the communication terminal devices, based on a call control protocol, to perform call control of each of communication terminal devices. The media converter uses the communication media standards discriminated and acquired to convert media data, delivered from each of the communication terminal devices, involved in communication, to a signal of the relevant communication media standard. The SIP server causes the communication media standard and information used for communication to be stored in an information memory. The media converter also includes a plurality of interfaces that receive or output control data, media data and non-media data delivered from each of the communication terminal devices. The interfaces each verify whether or not the received data is media data. The media converter further includes a media converter circuit that converts the communication media standard of received media data included in data received from the source communication terminal device to media data of the communication media standard of the destination communication terminal device. The media converter also includes a controller that reads out the information stored in the information memory. The controller controls the delivery of the read-out information to each of the interfaces and the media converter circuit to control the interfaces, media converter circuit and a data switcher. The data switcher switches data delivery to the interfaces, media converter circuit and the controller. In this manner, it is possible to discriminate communication media adopted in the communication terminal devices of the source and the destination of media data to convert the media depending on the communication media which has discriminated the data supplied to allow the communication terminal devices to be connected to each other.

BRIEF DESCRIPTION OF THE DRAWINGS

The objects and features of the present invention will become more apparent from consideration of the following detailed description taken in conjunction with the accompanying drawings in which:

FIG. 3 shows an example of information stored in an information memory shown in FIG. 2;

FIG. 7 shows an example of information stored in an encoding memory shown in FIG. 6.

DESCRIPTION OF THE PREFERRED EMBODIMENTS

Figure 1:
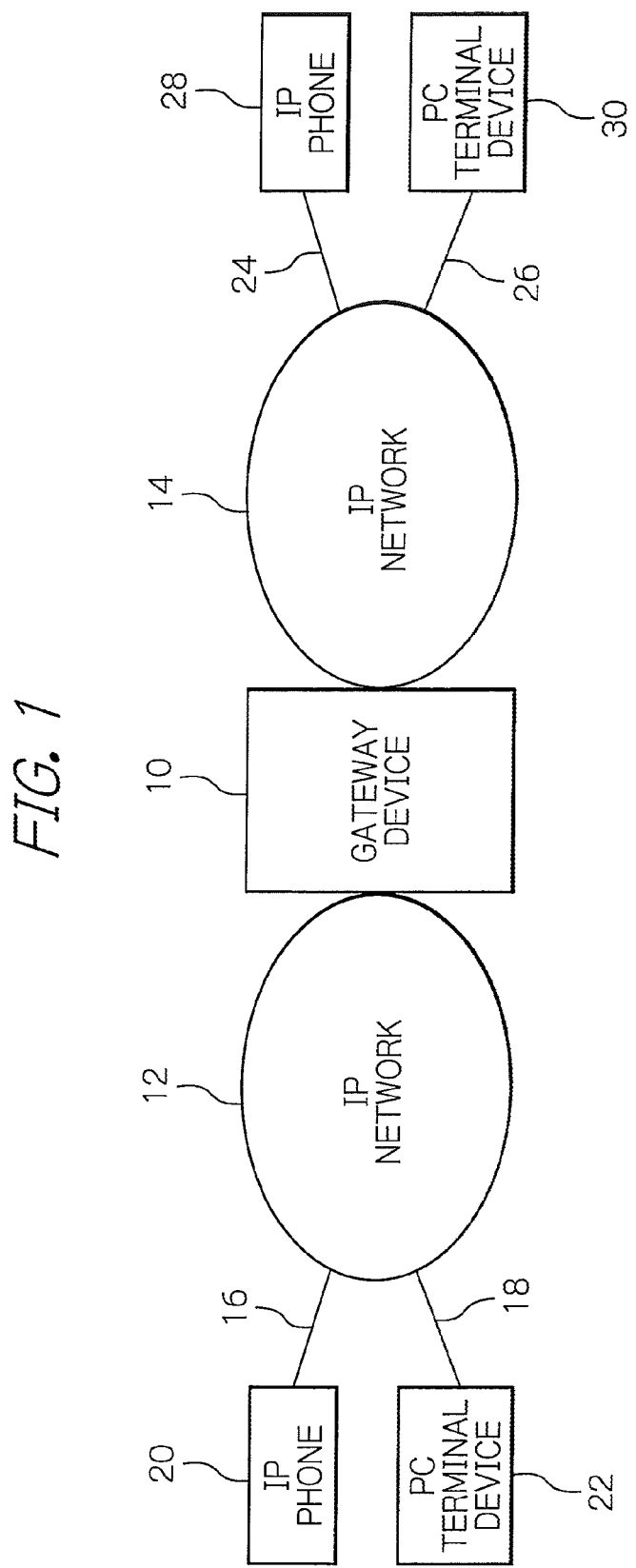
FIG. 1 schematically shows IP networks connected to terminal devices and via a gateway device including a media converter according to the present invention.

Preferred embodiments of the media conversion device according to the present invention will now be described with reference to the accompanying drawings. With reference to FIG. 1 first, a specific embodiment of a gateway device 10 according to the present invention is disposed between IP (Internet Protocol) networks 12 and 14 connected to communication terminal devices 22 and 30.

Figure 2:
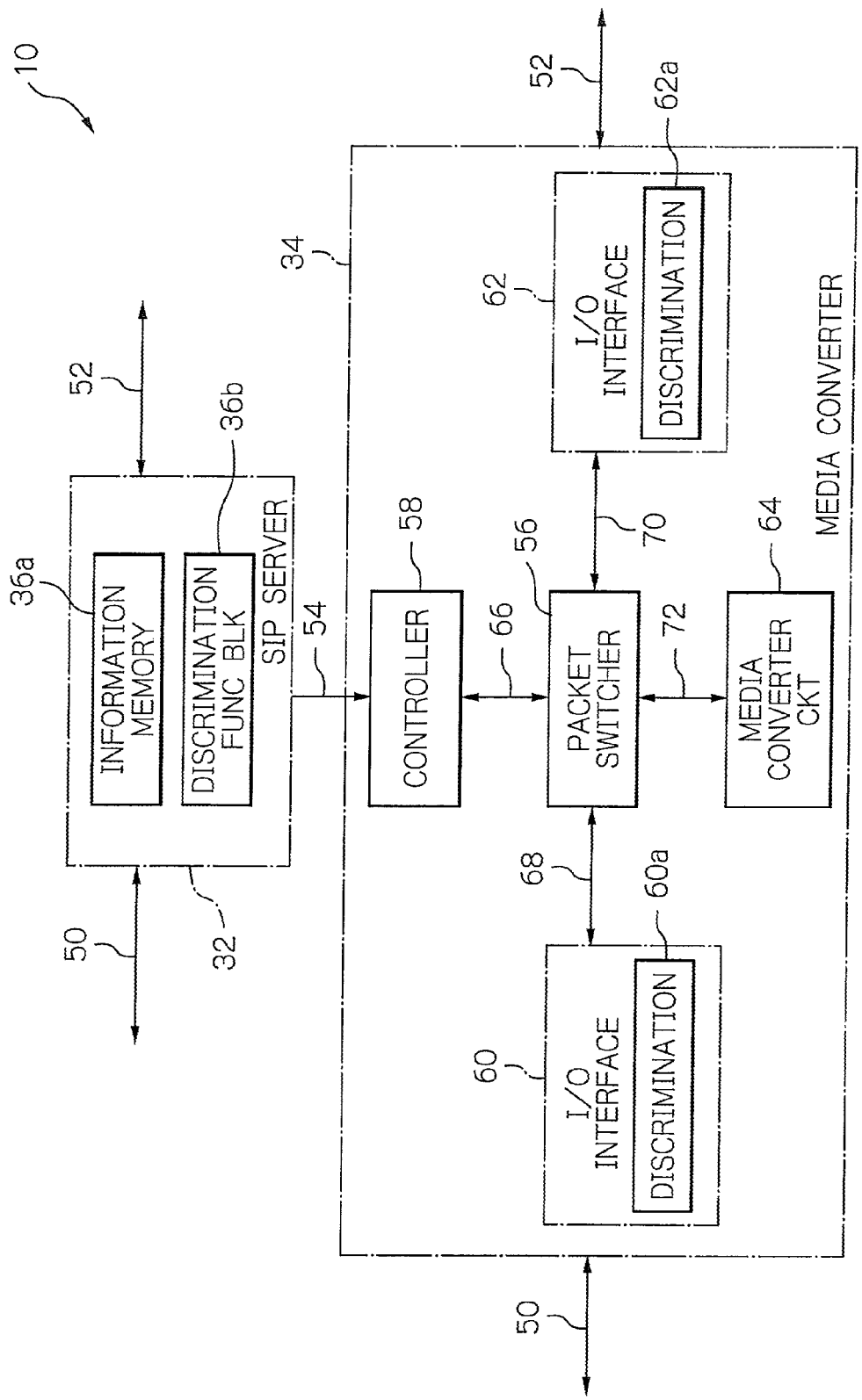
FIG. 2 is a schematic block diagram showing the configuration on an embodiment of the gateway device shown in FIG. 1.

More specifically with reference to FIG. 2, the gateway device 10 includes a SIP (Session Initiation Protocol) server 32 that uses control data for controlling multi-media communication, supplied from each of the communication terminal devices 22 and 30, based on a call control protocol, to discriminate the communication media standard adopted by each of the communication terminal devices to exercise call control of each of the communication terminal devices. The gateway device 10 also includes a media converter 34 that uses the communication media standards discriminated and acquired to convert multi-media data, delivered from each of the communication terminal devices, involved in communication, to a signal of the relevant communication media standard. The SIP server 32 causes the communication media standard and the information used for communication to be stored in an information memory 36a. The media converter 34 includes input/output (I/O) interfaces 60 and 62 that receive and output control data, media data and non-media data delivered from each of the communication terminal devices. The interfaces 60 and 62 determine whether or not the received data is media data. The media converter 34 also includes a media converter circuit 64 that converts the communication media standard of received media data included in data received from a source communication terminal device to media data of the communication media standard of a destination communication terminal device. The media converter 34 further includes a controller 58 that reads out the information stored in the information memory 36a to control the delivery of the read-out information to the input/output interfaces 60 and 62 and the media converter circuit 64 to thereby control the interfaces 60 and 62, the media converter circuit 64 and a data switcher 56. The data switcher 56 switches data delivery to the interfaces 60 and 62, the media converter circuit 64 and the controller 58. The communication media adopted by the source and the destination of transmission of media data may thus be discriminated, and the data delivered are media-converted in accordance with the communication media discriminated to allow the communication terminal devices to be connected to each other.

In the present embodiment, the media conversion device of the present invention is applied to a gateway device 10. Elements not having direct pertinence to understanding the present invention are not shown or described. In the following description, signals may sometimes be denoted by reference numerals of signal lines on which appear the signals.

The gateway device 10 is connected to the IP networks 12 and 14, as shown in FIG. 1. The gateway device 10 is arranged on the boundary between the IP networks 12 and 14, as shown in the figure, and performs the function of media conversion to predetermined media on the communication between the networks 12 and 14. Specific constituent elements of the gateway device 10 will be described in greater length subsequently. The IP networks 12 and 14, operating under the TCP (Transmission Control Protocol)/IP, may be networks laid by respectively different communication business organizations with a view to providing connection services for IP telephony and for Internet connection services in order to allow IP communication. An IP phone subscriber set 20 and a personal computer (PC) terminal device 22 are connected to the IP network 12 via connection lines 16 and 18, respectively. Another IP telephone subscriber set 28 and another PC terminal device 30 are connected to the IP network 14 via the connection lines 24 and 26, respectively.

The IP phones 20 and 28 are telephone terminal devices exploiting the IP telephony. The PC terminal devices 22 and 30 are responsible for web browsing and for data transfer.

When controlling the channel connection on the communication between the different devices, the IP phones 20 and 28 are controlled using a control signal packet. The control signal packet is of the control protocol for controlling the media communication, based on SIP (Session Initiation Protocol), that is, IFTF (Internet Engineering Task Force) RFC (Request for Comments) 3261 or ITU-T (International Telecommunication Union-Telecommunication Standardization Sector) H.323 standard.

When performing media communication between PC terminal devices 22 and 30, the IP phones 20 and 28 and the PC terminal devices 22 and 30 transmit and receive media data signal packets which carry media data. The media data signal packets are data signals conforming to packet forms prescribed from one encoding rule to another. The media data signal packets may be based on the RTP (Real-time Transport Protocol), that is, the reference standard of RFC3551.

In the present illustrative embodiment, the media data signal packets transmitted over the IP networks 12 and 14 and via the gateway device 10, placed therebetween, are of different forms, or standards. The gateway device 10 has the function of bidirectionally converting the forms of the media data signal packets to a format relevant for an appropriate transfer direction, even when the format of the media data signal packets supplied to the gateway device is not relevant to the transfer direction of interest, so that the media data signal packets will be unobjectionably transmitted in the transfer direction of interest to the terminal device connected to the IP network 12 or 14.

The IP phones 20 and 28 and the PC terminal devices 22 and 30 transmit and receive non-media data signal packets, when carrying out non-media communication therebetween. The non-media data signal packets are neither the control signal packets nor media data signal packets.

In the present embodiment, the non-media data signal packets, transmitted over the IP networks 12 and 14 and via the gateway device 10, placed therebetween, are of different forms. The non-media data signal packets may specifically be file transfer packets that are not controlled by a call control device arranged between the PC terminal devices 22 and 30.

In order to provide for such communication, the gateway device 10 includes the SIP server 32 and media converter 34. The configuration of the gateway device 10 may not be limited to specific one shown in FIG. 2. For example, the gateway device 10 may be implemented by a processor system including, e.g. CPU (Central processing Unit), a ROM (Read-Only Memory), a RAM (Random Access Memory), an EEPROM (Electrically Erasable Read-Only Memory) and a mass storage such as a hard disc drive as well as an interface for communication with another device, and adapted for executing program sequences for media conversion in accordance with the preferred embodiment installed thereon to execute the functions defined by the program sequences. Furthermore, the gateway device 10 may be structured by plural media converters, provided with the interfacing functions, and plural SIP servers arranged in a shared processing fashion.

The SIP server 32 has the function of controlling a call between the terminal devices over the IP networks 12 and 14. In the present embodiment, the SIP server 32 is a call controller and exercises call control between the IP phones 20 and 28. It is noted that the call controller is not limited to the SIP server 32 but may be sufficient if the call controller used has the function of controlling the multi-media communication in accordance with the RFC3261 or ITU-T H.323 standard.

The SIP server 32 includes an information memory 36a and a discrimination functional block 36b. The information memory 36a has stored therein media information. Media information is for use in controlling media conversion, and is exemplified by a session identifier 38, session identification information 40, a destination encoding rule 42 and a transmission source encoding rule 44, as shown in FIG. 3.

The session identifier 38 is for use in identifying a given voice call to indicates that when plural packets have the same identifier these packets are of a session involved in the same voice call. If bidirectional communication is being carried out for the same session between the IP phones 20 and 28, one information item is stored for the communication for one direction in the information memory 36a. Two information items involved in the same session may be provided with the common session identifier 38, as shown in FIG. 3.

The session identification information 40 is for use in identifying the destination of a session on the media communication by the media data signal packets. The session identification information 40 includes a destination IP address 46 and a destination port number 48. The destination IP address 46 denotes the IP address of a destination, and the destination port number 48 denotes the port number used in the communication with the session destination. Specifically, the port number for use in an IP/UDP (User Datagram Protocol) layer may be applied, for example.

The encoding rule valid for a destination, i.e. destination encoding rule, 42 is information on an encoding rule that is valid in the destination of a media packet being transmitted through the session in the media communication by the media data signal packets. The encoding rule valid for a source, i.e. transmission source encoding rule, 44 is information on an encoding rule that is valid in the transmission source of a media packet being transmitted through the session. For example, the information indicative of the sort of the encoding rules of G.722.1 (ITU-T G.722.1) or G.711μ-law (ITU-T G.711) may respectively be stored in the destination encoding rule field 42 and in the transmission source encoding rule field 44.

However, this is merely illustrative and other suitable information on the specifications of communication media may also be stored and applied. The sorts and the number of the pieces of information in the information memory 36a are not specifically limited to what are shown in FIG. 3. Examples of other information of the information memory 36a include information on the speech compression system or on the bit rate. In case the IP phones 20 and 28 are terminal devices of the television telephone sets, information on the specifications of images may also be stored as such other information.

The discrimination functional block 36b has the function of discriminating a communication media standard adopted by the IP phones 20 and 28 based on the SIP protocol. Although the discrimination functional block 36b may only be adapted to check a communication media standard, it may also be adapted to use information on communication in discriminating a communication media standard.

Returning to FIG. 2, the SIP server 32 is connected to the IP phones 20 and 28 by signal lines 50 and 52, respectively. When supplied with a control signal packet from the IP phones 20 and 28, the SIP server 32 analyzes the content of the control signal packet supplied to update the contents of the information memory 36a.

The SIP server 32 analyzes the content of a signaling message, such as an INVITE message, requesting a session to be established, in the SIP protocol, and discriminates communication media adopted by the IP phones 20 and 28. The SIP server 32 may update the content of the session identifier 38, session identification information 40, destination encoding rule 42 and transmission encoding rule 44.

When the SIP server 32 has received the INVITE message, contained in a control signal packet, from the IP phone 20, over signal lines 50 and 52, the SIP server may acquire, from the content of the INVITE message, the IP address of the IP phone 20, as the transmission source, and the information on the format of the communication media as adopted in the transmission source. On the other hand, if the IP phone 28 has received from the SIP server 32 the INVITE message in a control signal packet which has set the communication media not adopted by the IP phone 28, the latter sends a message that it cannot communicate, such as a message 'Not Acceptable', and the information on the format of the communication media adopted by the IP phone 28, to the SIP server 32. It is preferable for the SIP server 32 to acquire information on the format of the communication media, as used by the IP phone 28, based on response information.

The communication port number, as used by the IP phones 20 and 28 for communication, may be discriminated by analyzing the content of the response message, such as 'OK', to the INVITE message.

When the SIP server 32 has updated the contents of the information memory 36a, the SIP server sends the updated contents 54 to the media converter 34.

It should be noted that, when adding the information of the SIP server 32 in the information memory 36a, the SIP server 32 may add the information for only the IP phone for one direction, or simultaneously add the information for both directions, for both IP phones, for a given session. Specifically, when adding the destination IP address 46 of the IP phone 20, in the additional information, the SIP server 32 may simultaneously add the destination IP address 46 of the IP phone 28, as the communication peer, in the additional information. After the SIP server 32 has added only the information for only one direction, for a given session, if a control signal packet has been sent to the SIP server from one of the IP phones 20 and 28, using the same session identifier 38, then the SIP server 32 may apply the content of the transmission source encoding rule 44 of the already registered information as the destination encoding rule 42 to add the content of the transmission source encoding rule in the information memory 36a.

The media converter 34 in the gateway device 10 has the function of converting a received media data signal packet, depending on conditions, and transferring the so converted packet to the transfer destination. The media converter 34 includes a packet switcher 56, a controller 58, input/output interfaces 60 and 62, and a media converter circuit 64, which are interconnected as shown in FIG. 2.

The packet switcher 56 has the function of transferring packets to various parts of the media converter 34. The packet switcher 56 is connected by signal lines 66, 68, 70 and 72 to the controller 58, input/output interfaces 60 and 62, and media converter circuit 64.

The controller 58 has the function of controlling the operations of the various parts of the media converter 34. The controller 58 controls the packet switcher 56, input/output interfaces 60 and 62, and media converter circuit 64 via the signal line 66 and the packet switcher 56. When supplied from, e.g. the SIP server 32 with the information stored in the information memory 36a, the controller 58 transfers the information to the input/output interfaces 60 and 62 and the media converter circuit 64.

The input/output interfaces 60 and 62 in the media converter 34 have the function of transmitting packets from or receiving them from the IP networks 12 and 14. In the present embodiment, the input/output interfaces 60 and 62 are connected by signal lines 50 and 52 to the IP networks 12 and 14, respectively.

In an application where the media converter 34 is connected to three or more IP networks, the media converter 34 may include as many input/output interfaces 60 or 62 as such IP networks. It is also possible for the sole input/output interface 60 or 62 to be connected to plural IP networks.

The input/output interfaces 60 and 62 include discrimination functional blocks 60a and 62a, respectively, for discriminating the sorts of received packets. Based on the packet sorts, thus discriminated, the input/output interfaces 60 and 62 control the packet switcher 56, under the control of the controller 58, to transfer the packets received to the respective parts within the media converter 34. The discrimination functional blocks 60a and 62a of the input/output interfaces 60 and 62, respectively, determine whether the packets received are media data signal packets or non-media data signal packets. For determining the sorts of packets received by the input/output interfaces 60 and 62, it is possible to acquire information from the information memory 36a in advance, under the control of the controller 58, and to verify the received packet to be a media data signal packet if the session identification information of the received packet coincides with that entered in the session identification information 40. If the received packet is a packet not corresponding to the media data signal packet, then the received packet may be determined as a non-media data signal packet.

In case a received packet is a media data signal packet, the input/output interfaces 60 and 62 transfer the packet to the media converter circuit 64 via the packet switcher 56 controlled as described above. In case the received packet is a non-media data signal packet, then the media converter 34 transfers the packet, received from one of the input/output interfaces 60 and 62, to the other via the packet switcher 56 controlled as described above. The input/output interface 60 receives the non-media data signal packet, transmitted from the IP phone 20 to the IP phone 28, over the IP network 12. The non-media data signal packet received is transferred via the packet switcher 56 to the input/output interface 62. The input/output interface 62 transfers the non-media data signal packet, thus supplied, over the IP network 14 to the IP phone 28.

The media converter circuit 64 has the function of converting the format of a packet, thus supplied, to a media format which is valid in the transfer destination of interest, and sending out the resulting packet thus converted in format. The media converter 34 acquires information stored in the information memory 36a of the SIP server 32, under the control of the controller 58. The media converter 34 transmits the acquired information 66 from the packet switcher 56 as information 72 to the media converter circuit 64. The media converter circuit 64 verifies which one of the items of the session identification information 40 the transferred packet corresponds to, and converts the format of the media to the format specified by the relevant destination encoding rule 42 and the relevant transmission source encoding rule 44. The media converter circuit 64 outputs the packet the media format of which has been converted (media-converted packet) to the packet switcher 56, under the control of the controller 58. The packet switcher 56 switches the packet outputting direction to the direction of the input/output interface 60 or to the direction of the input/output interface 62, under the control of the controller 58, to output the packet 72, the media format of which has now been converted, to the direction thus set. Of course, the so set direction corresponds to the direction towards the transfer destination.

The operation of the gateway device 10 will now be described, of which the media converter 34 is configured in accordance with the present invention. It is assumed that a packet is being transferred from the IP phone 20 to the IP phone 28.

With the IP phone 20, the IP address is "10.0.0.1/24", the communication media adopted is G.711.μ-law and the communication port is "10001". With the IP phone 28, the IP address is "20.0.0.1/24", the communication media adopted is G.722.1 and the communication port is "20001". In the initial state, no information is stored in the information memory 36a of the SIP server 32.

Figure 4:
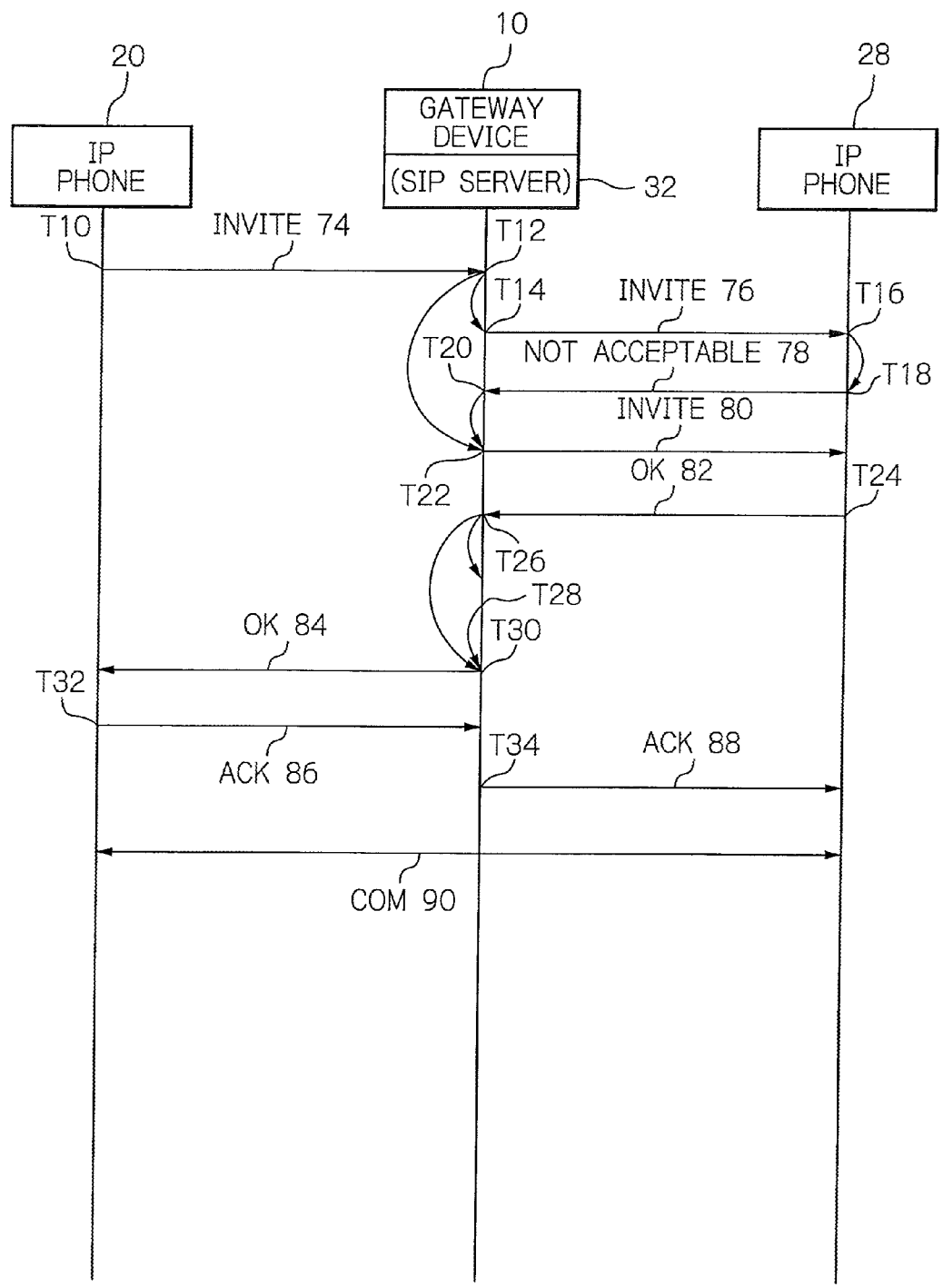
FIG. 4 is a sequential chart stating a packet communication sequence between IP telephone sets arranged on both sides of the gateway device shown in FIG. 2.

Under these conditions, the gateway device 10 exercises call control, and updates the media information. In actuality, the one IP phone 20 originates a call meant for the other IP phone 28, as shown in FIG. 4. In actuality, the IP phone 20 at this time T10 transmits a control signal packet to the SIP server 32 of the gateway device 10. This control signal packet is an INVITE message 74. The control signal packet includes the communication condition for the IP phone 20, that is, the information on the communication media (G.711μ-law) and the port number (10001).

The gateway device 10 extracts the information from the INVITE message 74 by the SIP server 32. At a time T12, the SIP server 32 acquires the IP address and the information on the port number used for the media communication, and retrieves the session identification information 40, that is, the information coincident with the destination IP address 46 and the destination port number 48. No information is detected at this stage because no information is stored in the information memory 36a.

The IP server 32 outputs, at time T14, the INVITE message, which is the same as the control signal packet supplied, to the IP phone 28 (INVITE message 76). It is because the information pertinent to the IP phone 20 is not stored in the information memory 36a. The INVITE message 76 includes the communication media G.711μ-law and the port number 10001.

The IP phone 28 receives the INVITE message 76, supplied thereto, at time T16, and confirms the content of the control signal packet. The communication media standard, adopted by the IP phone 28, is G.722.1. Since the communication media standard supplied is G.711μ-law, the IP phone 28 determines that it cannot communicate with the IP phone 20. Thus, at a time T18, the IP phone 28 outputs a response message 78 indicative of being unable to communicate (NOT ACCEPTABLE 78) to the SIP server 32. The response message 78 is a control signal packet inclusive of the information indicating that the communication media standard adopted by the IP telephone set 28 is G.722.1.

On receipt at a time T20 of the INVITE message 74 and the message NOT ACCEPTABLE 78, the SIP server 32 updates the information in the information memory 36a.

From the content of the control signal packet in the INVITE message, the SIP server 32 acquires the IP address (10.0.0.1) of the IP phone 20, the communication media used for the communication (G.711μ-law) and the port number (10001). From the content of the control signal packet in the message NOT ACCEPTABLE 78, the SIP server 32 acquires the communication media (G.722.1) used for the communication of the IP phone 28 to update the contents of the information memory 36a. The SIP server 32 also allocates "1" as the session identifier 38 for the information memory 36a.

The SIP server 32 acquires the information which is the condition used by the IP phones 20 and 28 for media communication. That is, the SIP server 32 generates the session identifier 38 as "1", the destination IP address 46 as "none", the destination port number 48 as "none", the destination encoding rule 42 as "G.722.1" and the transmission source encoding rule 44 as "G.711μ-law", as the information used for media conversion in the packet communication for the IP phone 28. The SIP server 32 causes the so generated information to be stored in the information memory 36a.

In a similar manner, the SIP server 32 generates the session identifier 38 as "1", the destination IP address 46 as "10.0.0.1", the destination port number 48 as "10001", the destination encoding rule 42 as "G.711μ-law" and the transmission source encoding rule 44 as "G.722.1", as the information used for media conversion in the packet communication for the IP phone 20. The SIP server 32 causes the so generated information to be additively stored in the information memory 36a.

When transmitting a packet to the IP telephone set 28, the SIP server 32 updates the destination IP address 46 and the destination port number 48 for the information used for media conversion in the step which is to be described subsequently.

From the information of the information memory 36a, the SIP server 32 sets the information on the communication media (G.722.1) of the IP telephone set 28 acquired, in the INVITE message. At a time T22, the SIP server 32 outputs the INVITE message as the control signal packet to the IP phone 28 (INVITE 80).

The IP phone 28 receives the control signal packet for the INVITE message 80. The communication media adopted by the IP phone 28 coincides with the communication media adopted by the INVITE message 80 supplied. The IP phone 28 at a time T24 outputs a control signal packet, along with a response message 82 (OK), to the SIP server 32. The control signal packet includes the IP address (20.0.0.1) and the communication port number (20001) of the IP phone 28 (OK 82).

Upon receipt of the response message 82, the SIP server 32 at a time T26 extracts the information from the response message 82, and updates the information in the information memory 36a of the session identifier 38 as "1" and the destination IP address 46 as "none" to the destination IP address 46 acquired of (20.0.0.1), while updating the information of the destination port number 49 as "none" to the information acquired as "20001". As a result, the contents of the information memory 36 are the same as those shown in FIG. 3.

The SIP server 32 transfers the information stored in the information memory 36a to the controlling 58 of the media converter 34. The controller 58 at a time T28 transmits the information stored in the information memory 36a to the media converter circuit 64 via the packet switcher 56.

The SIP server 32 at a time T30 outputs a response message 84 (OK), inclusive of the control signal packet, to the IP phone 20 (OK 84). The IP phone 20 at a time T32 transmits a message 86 (ACK) to the SIP server 32.

The SIP server 32 at a time T34 outputs a communication acknowledging message 88 (ACK) to the IP phone 28. Media communication is then conducted between the IP phones 20 and 28 via the media converter 34. The media converter 34 delivers a packet, supplied thereto from the input/output interface 60 or 62, to the media converter circuit 64, via the packet switcher 56, under the control of the controller 58, in order to carry out media conversion. The sequence of operations for media conversion will be described in detail subsequently. The media converter 34 outputs the media-converted packet via the input/output interface 60 or 62, via the packet switcher 56, under the control of the controller 58.

If, at a time T12, there is the information matched to the destination IP address 46 and the destination port number 48 in the information memory 36a, such that the SIP server 32 has succeeded in acquiring the information pertinent to the communication media adopted by the IP phone 28, that is, the information on the destination encoding rule 42, then the SIP server 32 performs the operation indicated at a time T22. The IP phone 28 sends a response message 82 to the SIP server 32 at a time T24. In this case, the SIP server 32 may transfer the processing at a time T30, after receipt of the response message 82, to continue subsequent operations.

The sequence of operations for media conversion by the media converter 34 will now be described with reference to FIG. 5. The premises for media conversion will be briefly described. The premises are that relevant information from the information memory 36a of the SIP server 32 has been set in the input/output interfaces 60 and 62, and the media converter circuit 64. For a case in which, following this setting, a media data signal packet, transmitted from the IP phone 20 to the IP phone 28, has been delivered to the media converter 34, an exemplary operation for media conversion of the present embodiment will now be described.

Initially, the input/output interface 60 receives a packet 92 sent out from the IP phone 20 to the IP phone 28.

The input/output interface 60 verifies whether the packet 92 received is a media data signal packet or a non-media data signal packet. The sort of the packet received is determined based on the information supplied from the information memory 36a. In case the received packet is coincident with the session identification information 40, the input/output interface 60 determines the packet to be a media data signal packet. In case the received packet is not coincident with the session identification information 40, the input/output interface 60 determines the packet to be a non-media data signal packet.

If the packet 92 received has been determined to be a media data signal packet, then the input/output interface 60 transfers the packet, as a packet 94, to the media converter circuit 64 via the packet switcher 56. If the packet 92 received has been determined to be a non-media data signal packet, the input/output interface 60 transfers the packet, as a packet 96, to the input/output interface 62 via the packet switcher 56.

When the received packet 94 has been transferred to the media converter circuit 64, the latter performs media conversion, based on the information stored in the information memory 36a. The information in the information memory 36a is the session identifier 38 representative of "1", the destination IP address 46 representative of "20.0.0.1", the destination port number 48 representative of "20001", the destination encoding rule 42 representative of "G.722.1" and the transmission source encoding rule 44 representative of "G.711μ-law", as shown in FIG. 3. In case the packet 94, determined to be the media data signal packet, has the destination IP address "20.0.0.1", and the destination port number "20001", the packet has the session identification information, that is, the destination IP address 46 and the destination port number 48, coincident with those of the session identification information 40 in the information delivered. Hence, the media converter circuit 64 media-converts the packet 94 from the G.711μ-law standard to the G.722.1 standard, in accordance with the destination encoding rule 42 and the transmission source encoding rule 44 supplied.

The media converter circuit 64 sends the media-converted packet as a packet 98 to the input/output interface 62. The input/output interface 62 sends out the delivered packet 98 as a packet 100 to the IP phone 28.

The input/output interface 62 sends out the packet 96, determined to be the non-media data signal packet, as a packet 102 to the IP phone 28.

Figure 5:
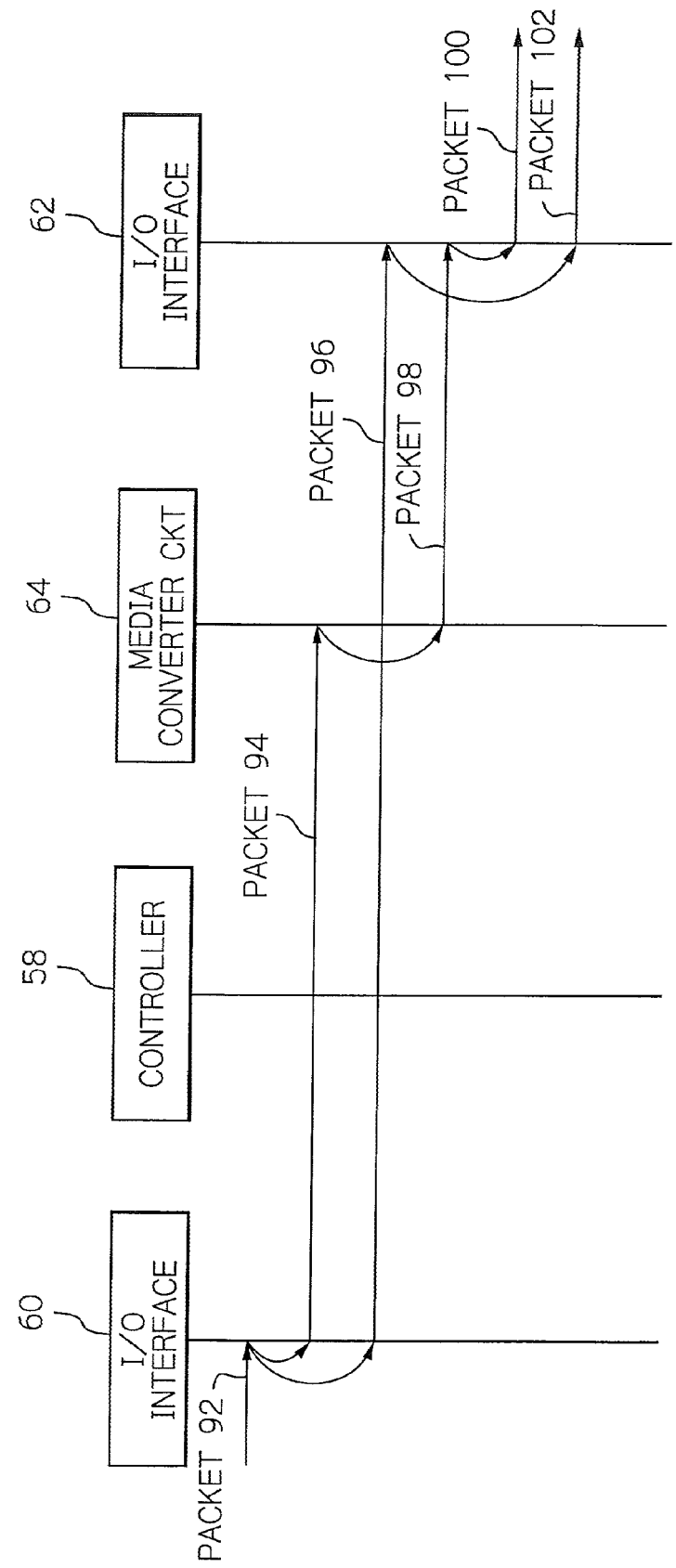
FIG. 5 is a sequential chart stating the sequence of media conversion of packets based on the information stored in the information memory shown in FIG. 2.
Figure 6:
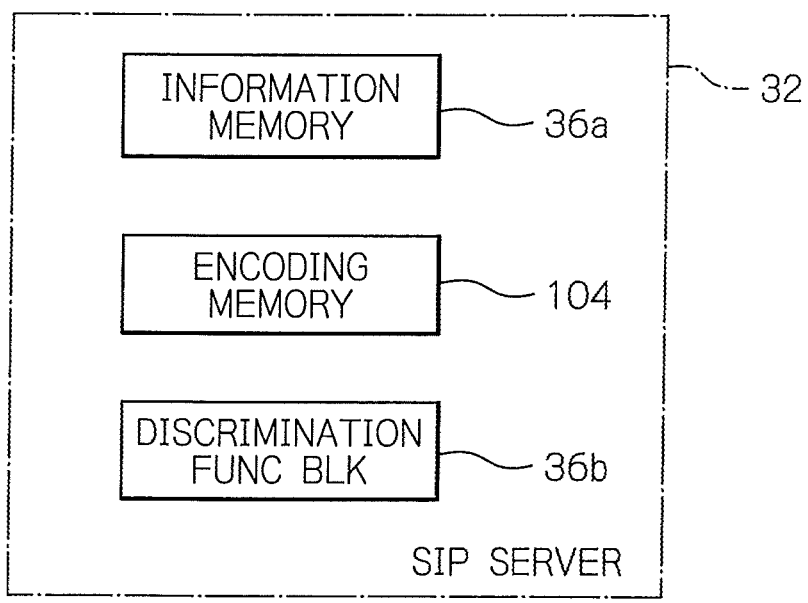
FIG. 6 is a schematic block diagram showing an alternative configuration of a SIP (Session Initiation Protocol) server shown in FIG. 2.

It should be noted that the controller 58 controls the information transfer from the information memory 36a, as well as the operations at the input/output interfaces 60 and 62, packet switcher 56 and media converter circuit 64, in a manner not shown in the sequential chart shown in FIG. 5.

In the gateway device 10, the SIP server 32 acquires the communication media information adopted by the IP phone 20 and that adopted by the IP phone 28, based on the content of the control signal packets supplied from the IP phones 20 and 28. The SIP server 32 discriminates the information, updates the information in the information memory 36a and sends out the information to the media converter 34. The media converter 34 converts the information between the IP phones 20 and 28, in response to the information supplied. Thus, media may be transmitted to each of the IP phones, in a manner conforming to the individual IP phones, even though multiple different communication media are adopted by the IP phones.

In the media converter 34, the input/output interfaces 60 and 62 discriminate whether or not the packet received is a media signal packet to be media-converted, and transmits only the media signal packet to the media converter circuit 64. This suppresses transfer delay otherwise caused in transferring the media data signal packet in the terminal devices.

An alternative embodiment of the gateway device 10 will now be described, which makes use of the media converter according to the present invention. It should be noted that the same reference numerals or symbols as the previous embodiment are used to designate like component elements, and a repetitive, corresponding description is dispensed with. The alternative embodiment differs from the previous embodiment as to the SIP server 32. In the alternative embodiment, the SIP server 32 includes an encoding memory 104 in addition to the information memory 36a and discrimination functional block 36b. In a manner different from the previous embodiment, the SIP server 32 of the alternative embodiment updates the information of the information memory 36a by taking the information in the encoding memory 104 into account.

The encoding memory 104 includes an identifier 106, an IP network address 108 and an encoding rule 110, as shown in FIG. 7. It should be noticed that information stored in the encoding memory 104 may be preset by a network manager, for example, depending on the state of network establishment.

The identifier 106 identifies information in the encoding memory 104. The IP network address 108 is identification information for identifying one or more IP networks and is represented in the form of network address defined by the IP protocol. The encoding rule field 110 denotes the encoding rule of a media data signal packet acceptable by a terminal device connected to the IP network address 108.

When supplied with a control signal packet from the input/output interface 60 or 62, the SIP server 32 analyzes the content of a control signal packet, and extracts the session identification information 40, that is, the information equivalent to the destination IP address 46 and the destination port number 48. The SIP server 32 retrieves the IP network address 108 which includes the IP address of the so determined destination terminal device or a call control device corresponding to the next destination so determined of the control signal packet.

If there is a relevant IP network address 108, the SIP server 32 updates the information of the information memory 36a, with the corresponding information of the encoding rule 110 as the destination encoding rule 42.

In the encoding memory 104, two items of information are stored as shown in FIG. 7. For the item "1" of the identifier 106, stored are the IP network address 108 as "10.0.0.0/24" and the encoding rule 110 as "G.711μ-law". For the item "2" of the identifier 106, stored are the IP network address 108 as "20.0.0.0/24" and the encoding rule 110 as "G.722.1".

It should be noted that, although the encoding memory 104 specifies an encoding rule on the network basis in the embodiment, an encoding rule need not necessarily be specified on the network basis, provided that it can be discriminated which of a plurality of groups a given terminal device belongs to. For example, it is possible with the encoding memory 104 to split the network into plural groups and to specify the range of the addresses from one group to another.

Figure 8:
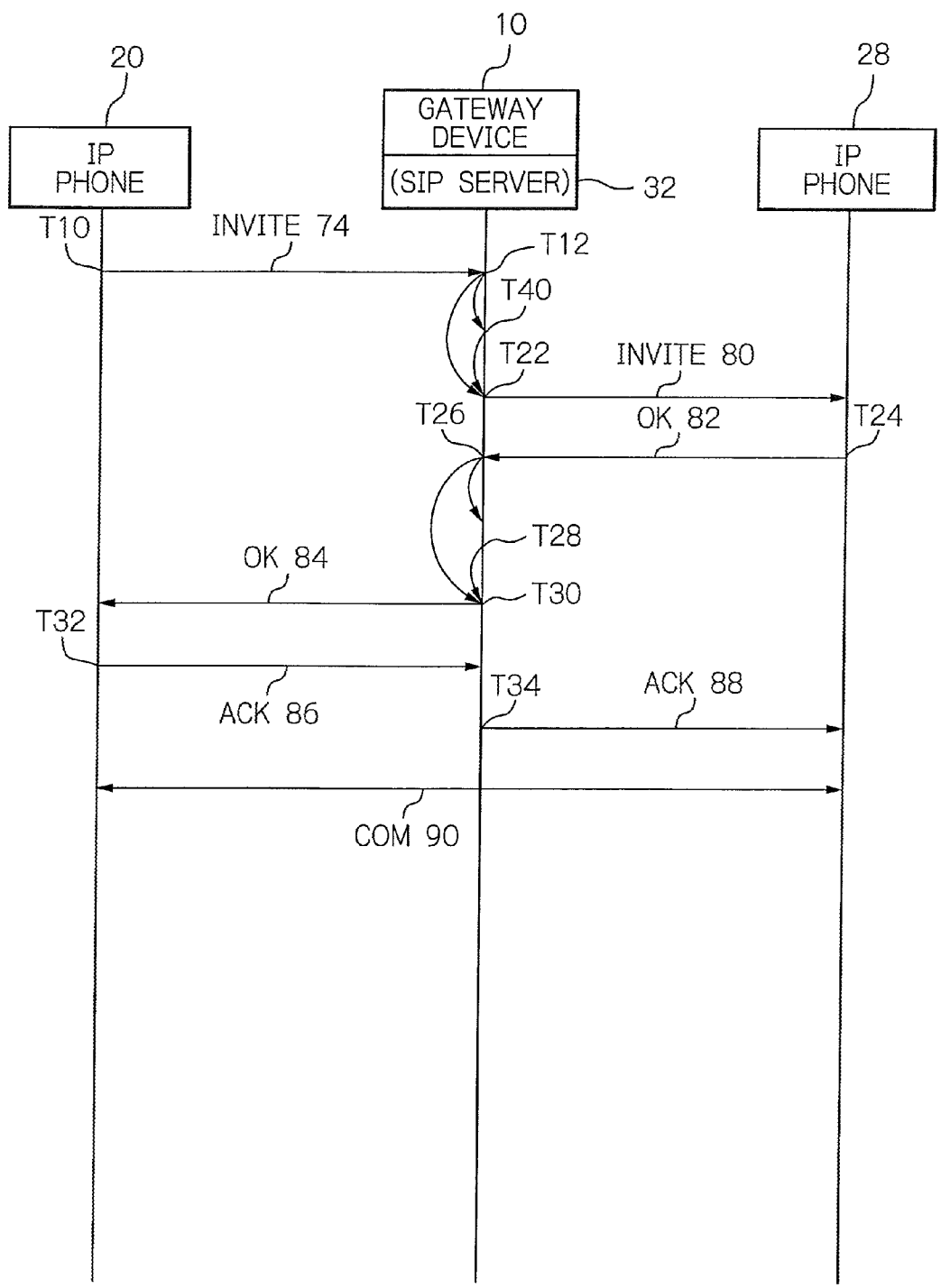
FIG. 8 is a sequential chart stating a packet communication sequence between IP telephone sets arranged on both sides of the gateway device shown in FIG. 6.

The operation of the gateway device 10 will now be described with reference to FIG. 8. The IP phone 20 has an IP address "10.0.0.1" and has the valid communication media of "G.711μ-law". The communication port of the IP phone 20, used for media communication, is "10001". The IP phone 28 has an IP address "20.0.0.1" and has the valid communication media of "G.722.1". The communication port of the IP phone 28, used for media communication, is "20001".

In the alternative embodiment, it is again assumed that the one IP phone 20 has originated a call meant for the other IP phone 28. The same reference numerals or symbols are used to depict common procedure steps and a corresponding repetitive description is dispensed with. At a time T10, the IP phone 20 outputs an INVITE message 74 in the form of control signal packet to the SIP server 32. The information on the communication media representative of "G.711μ-law" and the port number "10001" are included in the control signal packet as the communication condition adopted by the IP phone 20.

At a time T12, the SIP server 32 acquires the IP address and the port number, from the content of the INVITE message 74. The SIP server 32 then carries out retrieval to check whether or not the IP address and the port number in the information are coincident with the destination IP address 46 and the destination port number 48, respectively, in the session identification information 40. Since no information is stored in the information memory 36a, no information can be detected on retrieval.

In case there is no information relevant to the IP phone 20 in the information memory 36a, the SIP server 32 discriminates, at a time point T40, the condition concerning the communication media adopted by the IP phones 20 and 28, based on the content of the control signal packet received and on the information of the encoding memory 104, to update the information in the information memory 36a.

Thus, from the content of the control signal packet, the SIP server 32 is able to acquire the IP address (10.0.0.1) of the IP phone 20 and the information on its port number (10001) and on the communication media (G.711μ-law) adopted for communication. Further, the SIP server 32 identifies, based on the content of the control signal packet, the IP address (20.0.0.1) of the IP phone 28, as a called party, and researches the IP network address 108 of the encoding memory 104 for the matched information. The IP address (20.0.0.1) of the IP phone 28 is included in the IP network address 108 (20.0.0.0/24), for the information of the identifier 106 representative of "2", in encoding memory 104 of the alternative embodiment, as shown in FIG. 7. The SIP server 32 thus finds out that the encoding rule 110 (G.722.1) is the format of the communication media adopted by the IP phone 28. In the SIP server 32, a value "1" is accorded to the session identifier 38, as shown in FIG. 3.

The SIP server 32 acquires information on the condition of the media communication adopted by the IP phones 20 and 28. At this stage, the SIP server 32 produces, based on the above information, the session identifier 38 as "1", the destination IP address 46 as "20.0.0.1", the destination port number 48 as "none", the destination encoding rule 42 as "G.722.1" and the transmission source encoding rule 44 as "G.711μ-law", as the information used for media conversion in transmitting a packet to the IP phone 28. The SIP server 32 causes the so produced information to be additionally stored in the information memory 36a.

In a similar manner, the SIP server 32 produces the session identifier 38 as "1", the destination IP address 46 as "10.0.0.1", the destination port number 48 as "10001", the destination encoding rule 42 as "G.711μ-law" and the transmission source encoding rule 44 as "G.722.1", as information used for media conversion in transmitting the packet to the IP phone 20. The SIP server 32 causes the so produced information to be additionally stored in the information memory 36a.

Since the SIP server 32 has acquired the information used for transmission for the IP phone 28, the SIP server 32 sends the INVITE message 80 of the time T22 to the IP phone 28. The IP phone 28 at the time T24 outputs a response message 82 (OK) to the SIP server 32.

The destination port number 48, used for media conversion when transmitting a packet to the IP phone 28, is processed in the 'update' at the time T26, in the 'transfer' at the time T28 and in the 'response' at the time T30. The subsequent steps are thus the same as the steps shown in FIG. 4.

Thus, by specifying the encoding rule by the encoding memory 104 from one network to another, it is possible for the SIP server 32 to identify communication media adopted by a destination terminal device, without the necessity of acquiring information from the terminal device of a call destination in the control signal packet. That is, with the alternative embodiment, the processing corresponding to transmission of the INVITE message 76 and reception of the response message 78 of the previous embodiment, shown in FIG. 4, may be dispensed with, thus decreasing the sequences of control signals and hence the processing volume, and reducing a delay in processing otherwise caused in the gateway device 10.

The gateway device 10 may be implemented by a processor system performing the operations of the aforementioned respective components in sequence as dictated by control program sequences.

In the above-described embodiments, the gateway device 10 is applied to media-converting packets for IP phones. The gateway device 10 may, however, be applied to other forms of media communication, such as instant messaging in which messages are transmitted and received by a television telephone or in the form of texts. There is also no limitation to the sorts of communication media applied.

The gateway device 10 has thus far been described in connection with the illustrative embodiments in which the SIP protocol is used for a control signal packet. However, control signal packets are not limited to the specific type of packets of SIP, but instead it is sufficient that the gateway device may deal with a control signal packet used by a communication terminal device that may be a target of media conversion. Hence, the protocol may be other than SIP. An example of such other protocol is H.323. The control signal packets used in the IP networks 12 and 14 are of SIP with the illustrative embodiments. Thus, respectively different control signals may be used between the IP networks 12 and 14 so that a call control device may deal with multiple kinds of control signals.

In the above-described embodiments, the gateway device 10 is arranged on a boundary between the IP networks 12 and 14, and packets, flowing between the IP networks 12 and 14, are subjected to media conversion. Alternatively, the present invention may, of course, be applied to a gateway device arranged not between plural IP networks but within a sole IP network to carry out media conversion on multi-media communication between different terminal devices.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A media conversion device for relaying media communication between a plurality of communication terminal devices connected to a plurality of different networks, said media conversion device comprising:
   a server for discriminating communication media standards adopted by said communication terminal devices from control data controlling the media communication and supplied from said communication terminal devices, based on a call control protocol, to exercise call control for said communication terminal devices, said server including a first memory for storing the communication media standards and information used for communication; and
   a media converter, using the communication media standards thus discriminated, for converting in real-time media data supplied from said communication terminal devices into a signal of a relevant communication media standard, said media converter including
   a plurality of interfaces for receiving or outputting the control data, the media data and non-media data supplied from said communication terminal devices and for verifying whether or not received data is the media data, a converter circuit for converting communication media standards of received media data included in the data received from said communication terminal devices into media data of the relevant communication media standard of one of said communication terminal devices at an output destination, and a controller for reading out the information stored in said first memory, so as to control delivery of the read-out information to said interfaces and said converter circuit, and in turn to control said interfaces, said converter circuit and a data switcher, said data switcher switching data transfer to said interfaces, said converter circuit and said controller, said information stored in said first memory including a session identifier identifying a call, session identification information identifying an IP address and a port number of a destination of the call, and an encoding rule of the destination, wherein each of said plurality of communication terminal devices belongs to one of a plurality of communication terminal device groups, said information stored in said first memory including information on which of the plurality of groups to which one of said communication terminal devices belongs, and also including information specifying which of the communication media standards is adopted for the group to which said one communication terminal device belongs, said server being responsive to delivery of a control signal from said one to another of said communication terminal devices to discriminate which of the communication media standards is adopted by another said communication terminal device based on the control signal and the information stored in said first memory.

2. The media conversion device in accordance with claim 1, wherein said server includes a second memory for storing information including information used for the communication, said server retrieving the information stored in said first and second memories, said server acquiring and storing in said first memory a communication media standard stored in said second memory and hit on retrieval.

3. The media conversion device in accordance with claim 1, wherein said interfaces verify a sort of the received data, said controller controlling said data switcher, based on a result of decision of the sort, and sending the media data to said converter circuit.

4. A media conversion method for relaying media communication between communication terminal devices connected to a plurality of different networks, said method comprising:

storing communication media standards and information used for communication, including to which of a plurality of communication terminal device groups each of the communication terminal devices belongs to and including information on a communication media standard for the communication terminal device group which said each communication terminal device belongs to, and including a session identifier identifying a call, session identification information identifying an IP address and a port number of a destination of the call, and an encoding rule of the destination, the storing including performing call control of communication terminal devices for controlling media communication between a pair of the communication terminal devices each belonging to one of the plurality of communication terminal device groups, by using control data to discriminate between the communication media standards adopted by the communication terminal devices based on a call control protocol;

using the communication media standards thus discriminated to convert media data, delivered from the communication terminal devices, into a signal of a relevant communication media standard in real time, including reading out the stored information and controlling delivery of the read-out information, receiving the control data, the media data and non-media data, delivered from one of the communication terminal devices, and verifying whether or not the received data is the media data, converting the communication media standard of received media data included in the data received from the one communication terminal device to media data of one of the communication standards which is used by another of the communication terminal devices, and outputting the converted media data to the another communication terminal device; and discriminating the communication media standard adopted by the another communication terminal device based on the control data and the stored information in response to delivery of the control data from the one to the another of the communication terminal devices, wherein the received media data is processed in conformity with RTP (Real Time Protocol).

5. The method in accordance with claim 4, wherein said storing includes storing additional information including the information used for the communication, retrieval being made based on the information stored in said storing and the information including the additional information, a communication media standard included in information hit on the retrieval being acquired and stored.

6. A non-transitory recording medium storing a media conversion program that when installed on and executed by a computer is operable to execute a media converter method, the non-transitory recording medium including:

a first functional block for discriminating communication media standards adopted by a plurality of communication terminal devices from control data for controlling media communication output from the communication terminal devices, based on a call control protocol, to perform call control on the communication terminal devices, said first functional block including a first functional subblock for storing the communication media standards and information used for communication; and a second functional block for using the communication media standards discriminated and acquired to convert media data delivered from the communication terminal devices into a signal of a relevant communication media standard, said second functional block including a plurality of interface functional subblocks for receiving or outputting the control data, the media data and non-media data supplied from the communication terminal devices, and for verifying whether or not received data is the media data, a conversion functional subblock for converting, in real-time, the communication media standard of received media data included in the data received from the communication terminal devices into media data of one of the communication standards used by the communication terminal device as a destination device, a control functional subblock for reading out the information stored in said first functional subblock, for controlling delivery of the read-out information to said interface functional subblocks and said conversion functional subblock, and for controlling said interface functional subblocks, said conversion functional subblock and said control functional subblock, and a data switching functional subblock for switching data delivery to said interface functional subblocks, said conversion functional subblock and said control functional subblock, said information included in said first functional block including a session identifier identifying a call, session identification information identifying an IP address and a port number of a destination of the call, and an encoding rule of the destination, each of said plurality of communication terminal devices belongs to one of a plurality of communication terminal device groups, said stored information including information on which of the plurality of groups to which one of said communication terminal devices belongs, and also including information specifying which of the communication media standards is adopted for the group to which said one communication terminal device belongs, said first functional block responding to delivery of a control signal from said one to another of said communication terminal devices to discriminate which of the communication media standards is adopted by another said communication terminal device based on the control signal and the information stored in said first memory.

7. A media converter for converting media data delivered from a plurality of communication terminal devices into a signal conforming to a relevant communication media standard, using communication media standards discriminated, said media converter comprising:

a plurality of interfaces for receiving or outputting the control data, the media data and non-media data, delivered from said communication terminal devices, and for verifying whether or not received data is the media data;

a converter circuit for converting, in real time, the communication media standard of received media data included in the received data from said communication terminal devices into media data of one of the communication media standards of one of said communication terminal devices at an output destination; and a controller for reading out information stored in a first memory, configured to store the communication media standards and information used for communication, for controlling delivery of the read-out information to said interfaces and said converter circuit, and for controlling said interfaces, said converter circuit and a data switcher, said data switcher switching data delivery to said interfaces, said converter circuit and said controller, wherein said information stored in said first memory including a session identifier identifying a call, session identification information identifying an IP address and a port number of a destination of the call, and an encoding rule of the destination, each of said plurality of communication terminal devices belongs to one of a plurality of communication terminal device groups, said information stored in said first memory including information on which of the plurality of groups to which one of said communication terminal devices belongs, and also including information specifying which of the communication media standards is adopted for the group to which said one communication terminal device belongs.

* * * * *